United States Patent [19]

Lo

[11] Patent Number: 5,699,083

[45] Date of Patent: Dec. 16, 1997

[54] CURSOR CONTROL DEVICE

[75] Inventor: Shun-Jung Lo, 5F, No.2, Lane 364, Ti-Hua St., Sec. 2, Taipei, Taiwan

[73] Assignees: Shun-Jung Lo; Abeam Technology Co. Ltd., both of Taipei, Taiwan

[21] Appl. No.: 564,392

[22] Filed: Nov. 29, 1995

[51] Int. Cl.$^6$ ........................................................... G09G 5/08
[52] U.S. Cl. ............................................. 345/165; 345/166
[58] Field of Search ..................................... 345/156, 157, 345/158, 163, 164, 165, 145, 166, 167; 463/37, 38; D14/114, 100; 74/471; 250/231.14, 231.15, 231.16; 200/5 A, 5 R; 273/148 B

[56] References Cited

U.S. PATENT DOCUMENTS

| Re. 32,632 | 3/1988 | Atkinson | 345/165 |
|---|---|---|---|
| 5,311,209 | 5/1994 | Lin | 345/164 |

Primary Examiner—Richard Hjerpe
Assistant Examiner—Lun-Yi Lao
Attorney, Agent, or Firm—Browdy and Neimark

[57] ABSTRACT

A cursor control device includes a body accommodating a circuit board and having a bottom circular hole for accommodating a ball. The body further has a pair of encoders, each of which includes a wheel with a spindle extending in the direction of the ball and rubbing against the ball. When the ball rolls, the wheel may synchronously rotate with the ball. A light source and a sensor are respectively disposed on both sides of the wheel. The cursor control device further includes a first securing seat and a second securing seat, in which the wheel may be mounted on the first securing seat and the light source and the sensor may be mounted on the second securing seat. Both securing seats may be directly mounted onto the circuit board to achieve easy assembly.

2 Claims, 5 Drawing Sheets

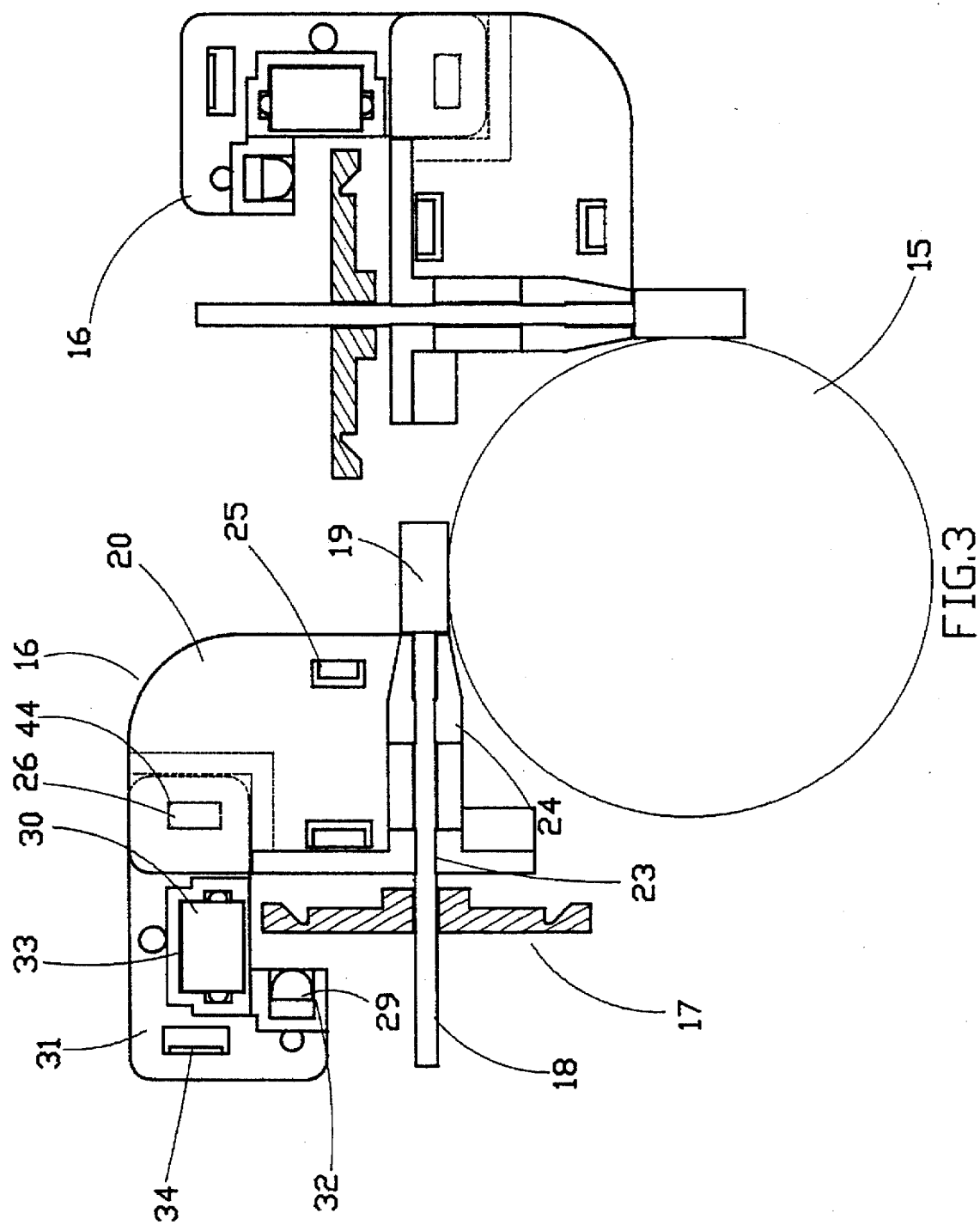

5,699,083

CURSOR CONTROL DEVICE

BACKGROUND OF THE INVENTION (a) Field of the Invention

The present invention relates generally to a cursor control device, and more particularly to a cursor control device which facilitates mounting of the wheels, light sources and sensors on a circuit board.

(b) Description of the Prior Art

Conventional cursor control devices generally fall into three main types, namely, mechanical, optical and semi-optical. In semi-optical cursor control devices, the structure generally includes a body containing a circuit board therein and having a hole in a bottom side thereof for mounting of a ball which may roll freely therein. The body also accommodates a couple of encoders, each including a wheel which has a spindle extending in the direction of the ball and being in a frictional relationship therewith, such that the wheel may rotate synchronously with the ball.

On both sides of the wheel are respectively provided a light source and sensor. The light emitted by the light source is just perpendicular to the spindle, and the sensor is disposed in the proximity of the periphery of the wheel so as to receive light passing via the periphery of the wheel. When the wheel rotates, the light emitted by the light source will be partly blocked by the wheel and will partly pass via the periphery of the wheel. These two conditions may be respectively represented by 0 and 1. When the wheel performs continuous rotation (whether clockwisely or counter-clockwisely), the following four signals will be obtained: (1, 1), (0, 1), (0, 0) and (1, 0). After undergoing conversion by means of the circuit board, these signals may control a cursor to move across the screen of a display. The encoders are provided to respectively control the cursor to move across the screen horizontally and vertically, or in any other direction.

However, in the conventional cursor control devices, the relative position among the wheel, light source and sensor greatly affects the precision of the reading of the signals, hence the control of the cursor. It is also well known that the wheel, light source and sensor are directly planted on the circuit board. Mounting and positioning of these components directly on the circuit board is very inconvenient and time-consuming, and production speed is slow as well.

SUMMARY OF THE INVENTION

Accordingly, a primary object of the present invention is to provide a cursor control device in which wheels, light sources and sensors may be conveniently and speedily assembled to a circuit board without any need for adjustment of their positions.

To achieve the aforementioned object, the cursor control device of the present invention comprises a couple of encoders, each of which is provided with a first securing seat and a second securing seat, the second securing seat having two positioning slots for receiving a light source and a sensor respectively, the first securing seat having a couple of recesses for installation of a wheel, both securing seats further having lugs at a bottom side thereof, which may be conveniently and firmly connected to a circuit board.

BRIEF DESCRIPTION OF THE DRAWINGS

The foregoing and other features and advantages of the present invention will be more clearly understood from the following detailed description and the accompanying drawings, in which.

FIG. 3 is a top view of the encoders and a ball of the cursor control device of the invention.

DETAILED DESCRIPTION OF THE PREFERRED EMBODIMENT

Figure 1:
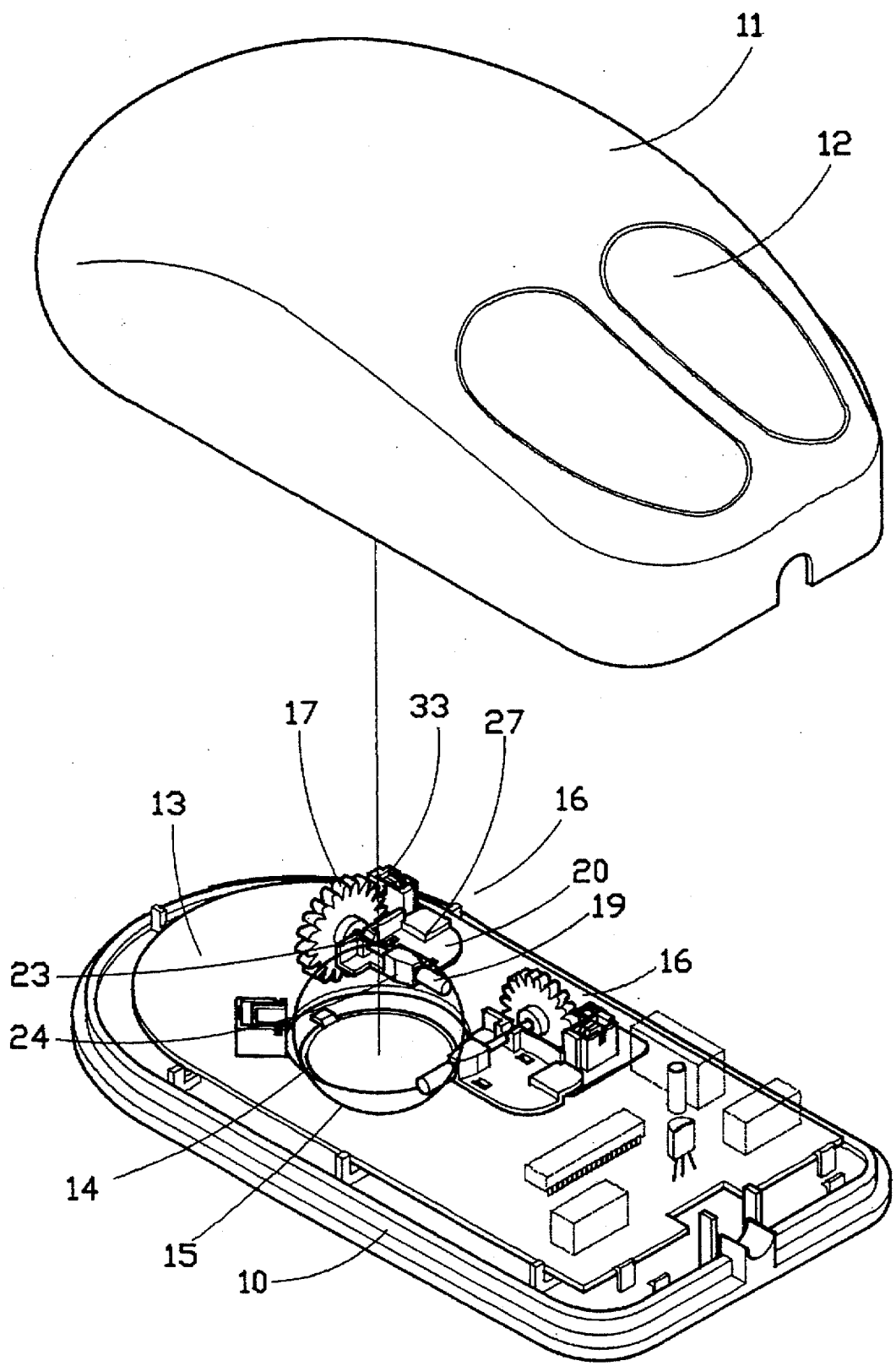
FIG. 1 is a perspective view of the cursor control device of the invention in an assembled state.
Figure 2:
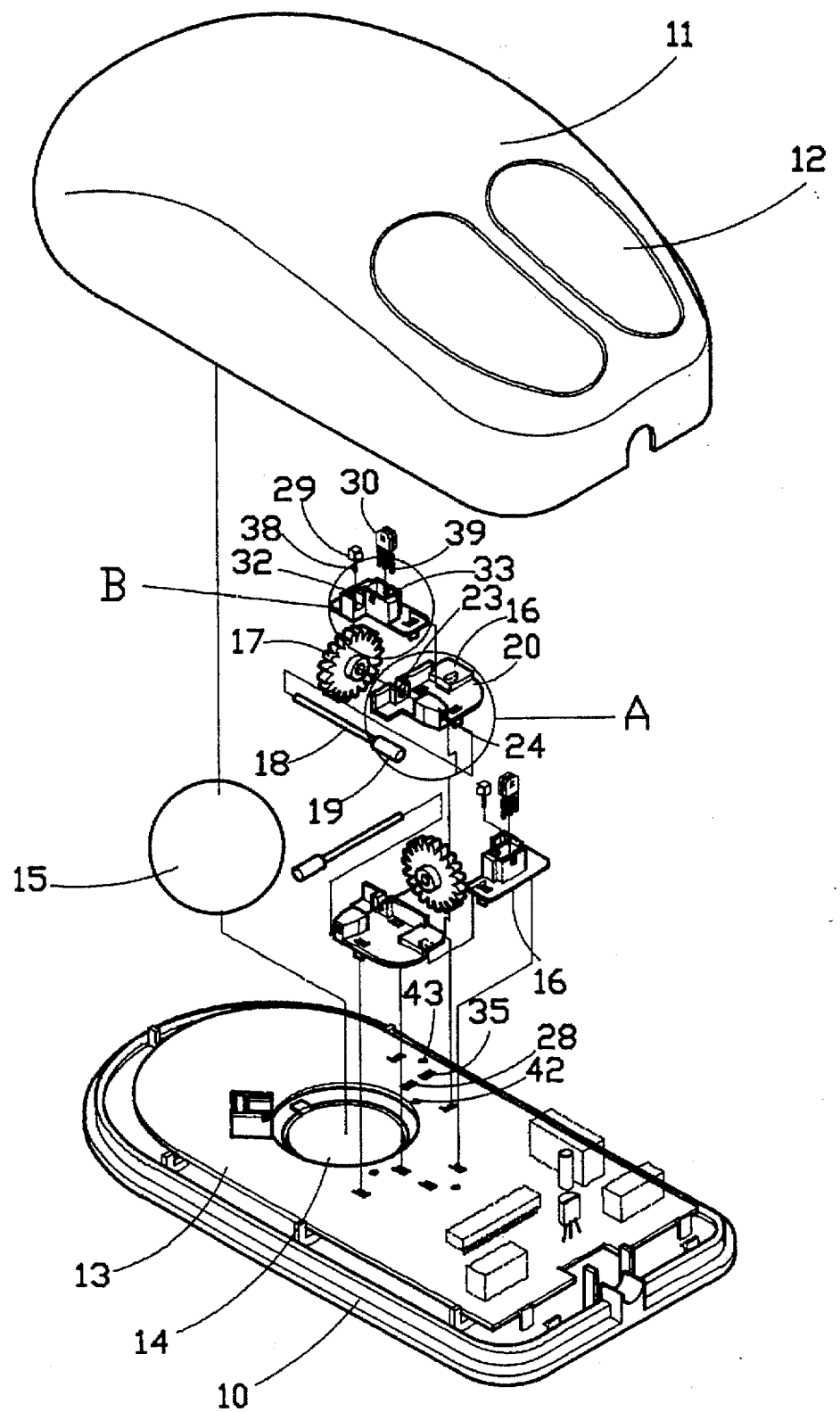
FIG. 2 is a perspective exploded view of the invention.
Figure 2A:
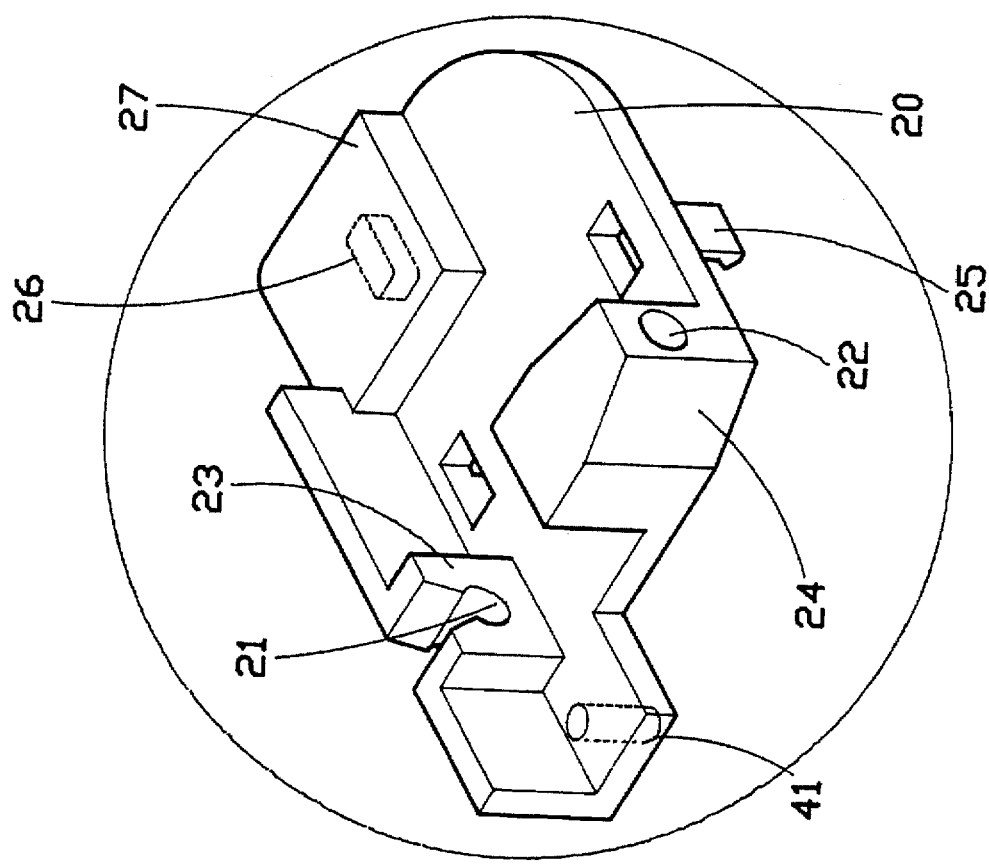
FIG. 2A is an enlarged view of part A of FIG. 2.
Figure 2B:
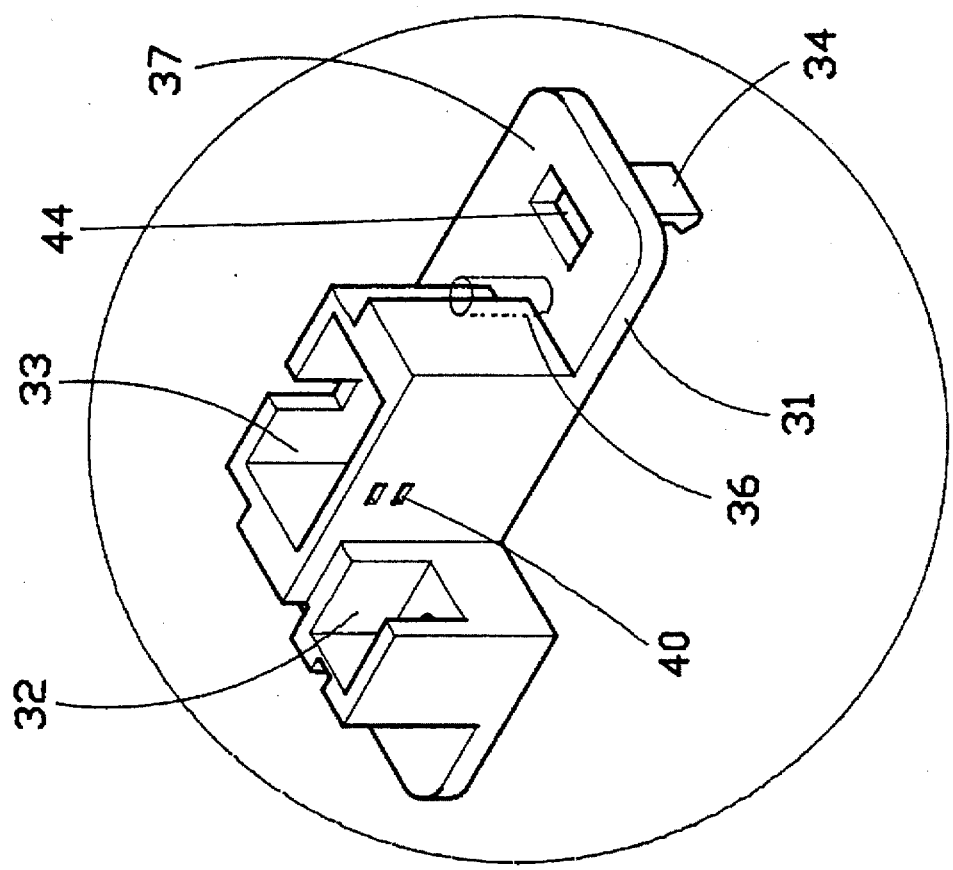
FIG. 2B is an enlarged view of part B of FIG. 2.

With reference to FIGS. 1 and 2, the cursor control device according to the invention essentially comprises a body 10, a cap 11 provided with a plurality of push buttons 12 for covering an upper side of the body 10 to conceal the interior thereof, and a circuit board 13 within the body 10. The body 10 has a circular hole 14 in a bottom side thereof for accommodating a ball 15, which may move freely within the hole 14.

The cursor control device of the invention further comprises a couple of encoders 16. Each encoder 16 includes a wheel 17 with a spindle 18 extending in the direction of the ball 15. The spindle 18 has one end thereof fixedly provided with a roller 19 which rubs against the ball 15, such that when the ball 15 rotates, the wheel 17 is caused to rotate synchronously therewith.

As shown in FIG. 2, 2A, 2B and 3 a first securing seat 20 is disposed below the wheel 17 and has a couple of recesses 23, 24 with notches 21, 22 provided on an upper side thereof. The spindle 18 supporting the wheel 17 is pivotally mounted on the first securing seat 20, with the wheel 17 and the roller 19 respectively located intermediate the recesses 23, 24. The first securing seat 20 has at least two projecting hook-like lugs 25 and a positioning pin 41 on a bottom side thereof, and a raised portion 27 at a corner of the upper side thereof. The raised portion 27 has a projection 26 projecting from a lower side therefor for matching a slot 44 of a second securing seat 31.

A light source 29 (such as an LED) and a sensor 30 are respectively provided on both sides of the wheel 17. The light source 29 and the sensor 30 are positioned on the second securing seat 31, which has two positioning slots 32 and 33 in an upper side thereof for receiving the light source 29 and the sensor 30 respectively. After the light source 29 and the sensor 30 are firmly secured within the positioning slots 32 and 33, guide legs 38 and 39 may pass through corresponding through holes (not shown) in the bottom side of the second securing seat 31 to be welded onto the circuit board 13. In addition, two through holes 40 are formed in a side wall of the positioning slot 33 to allow entrance of light passing via the wheel 17. The second securing seat 31 has at least two hook-like lugs 34 and a positioning pin 36 at a bottom side thereof.

After the light source 29 and the sensor 30 are respectively mounted on the second securing seat 31, the lugs 34 and positioning pin 36 thereof may be directly inserted into matching insert holes 35 and a positioning hole 43 in the circuit board 13, so that the light source 29 and the sensor 30 may be positioned properly on the circuit board 13. After the second securing seat 31 is positioned on the circuit board 13, the first securing seat 20 may be directly inserted into corresponding insert holes 28 and a positioning hole 42 in the circuit board 13 so that the wheel 17 may be properly positioned thereon.

The second securing seat 31 has an extended portion 37 having the slot 44 for receiving the projection 26 of the raised portion 27 when the first securing seat 20 is positioned on the second securing seat 31.

The light source 29 is disposed such that the light emitted thereby is just perpendicular to the wheel 17, and the sensor 30 is located near the periphery of the wheel 17 so as to receive the light passing via the periphery of the wheel 17. When the wheel 17 rotates, the light emitted by the light source 29 will be partly blocked by the wheel 17 and will partly pass via the periphery of the wheel 17; these two conditions may be respectively represented by 1 and 0. Therefore, when the wheel 17 performs continuous rotation, whether clockwisely or counter-clockwisely, four signals may be obtained: (1, 1), (0, 1), (0, 0) and (1, 0). These signals are converted via the circuit board 13 so that they may control the cursor to move across the screen. The two encoders 16 are provided to respectively control the vertical and horizontal movements of the cursor so that the cursor may move in any direction on the screen.

In the present invention, since the light sources 29, the sensors 30 and the wheels 17 may be respectively pre-mounted on the first securing seat 20 and the second securing seat 31, and since lugs 25 and 34 may be directly fitted into the circuit board 13 to facilitate assembly of the cursor control device, the trouble of adjusting and positioning the light sources, the sensor, and the wheel on the circuit board as in the prior art is eliminated.

Although the present invention has been illustrated and described with reference to the preferred embodiment thereof, it should be understood that it is in no way limited to the details of such embodiment but is capable of numerous modifications within the scope of the appended claims.

What is claimed is:

1. A cursor control device comprising:

a body having a cap with a plurality of push buttons, said body accommodating a circuit board therein and having a circular hole in a bottom side of the body thereof for mounting a ball, said body further accommodating two encoders, each of said encoders including a wheel with a spindle extending towards said ball such that said spindle rubs against said ball when said ball rolls within said circular hole, wherein a first securing seat is provided below said wheel, said first securing seat being provided with a plurality of recesses for pivotally supporting said spindle of said wheel and having a couple of hook-like lugs and a positioning pin projecting from a bottom side of the first securing seat thereof, said lugs and said positioning pin being respectively inserted into a first pair of insert holes and a first positioning hold correspondingly formed in said circuit board such that said wheel is positioned properly on said circuit board, and a second securing seat having two positioning slots is provided so that a light source and a sensor are respectively positioned in said positioning slots thereof, said second securing seat having a pair of hook-like lugs and a positioning pin projecting from a bottom side of the second securing seat thereof, which are respectively inserted into a second pair of insert holes and a second positioning hole correspondingly formed in said circuit board such that said light source and said sensor are positioned properly on said circuit board and such that light emitted by said light source passes via a periphery of said wheel to be received by said sensor.

2. A cursor control device as claimed in Claim 1, wherein said second securing seat has an extended portion provided with a slot and said first securing seat has a raised portion on an upper side thereof for matching said extended portion, said raised portion having a projection for fitting into said slot of said second securing seat so that said first securing seat is connected to said second securing seat.

* * * * *